United States Patent [19]

Wagner

[11] 4,315,352
[45] Feb. 16, 1982

[54] LOCKING DEVICE FOR A BRACELET OR NECKLACE

[76] Inventor: Hans R. Wagner, Rte. de Plagne 82, CH-2537 Vauffelin/BE, Switzerland

[21] Appl. No.: 973,786

[22] Filed: Dec. 27, 1978

[30] Foreign Application Priority Data

Dec. 27, 1977 [CH] Switzerland ............ 16054/77

[51] Int. Cl.³ ............................................. A44B 13/00
[52] U.S. Cl. ...................................... 24/241 SP; 59/89
[58] Field of Search ......... 24/241 P, 241 PL, 241 SP, 24/73 HH, 73 HR, 73 CE; 59/89, 88

[56] References Cited

U.S. PATENT DOCUMENTS

| 909,037 | 1/1909 | Taylor | 59/89 |
| 1,220,002 | 3/1917 | Rice | 24/73 CE |
| 1,314,832 | 9/1919 | Roberts | 59/89 |
| 1,482,664 | 2/1924 | Smith | 24/241 SP |
| 3,599,298 | 8/1971 | Anderson | 59/89 |

OTHER PUBLICATIONS

Offenlegungsschrift No. 2222303 to Robertz, 11/73.

Primary Examiner—Roy D. Frazier
Assistant Examiner—Alexander Grosz
Attorney, Agent, or Firm—Allison C. Collard; Thomas M. Galgano

[57] ABSTRACT

A locking device for bracelets and necklaces having two ends, each provided with a chain link, includes a first plate and a second plate which are pivotably coupled together for movement about a common pivot axis between an opening and locking position. The plates each have an aperture formed therethrough aligned with the pivot axis through which one of the chain links may extend and the first plate has a hook-like end portion for receiving the other of the chain links. The second plate has an arcuate slot formed therein running in a concentric manner with respect to the pivot axis which defines an arched portion on an end portion of the second plate disposed distal to the pivot axis relative to another end portion thereof. The arched portion also runs concentrically with respect to the pivot axis and, in the locking position, is received through the other chain link received in the hook-like end portion of the first plate.

5 Claims, 5 Drawing Figures

LOCKING DEVICE FOR A BRACELET OR NECKLACE

The invention relates to a locking device for a bracelet or necklace, whereby the two ends are provided with a chain link.

The best known chain link locking device consists of a slotted, hollow ring coupled to one end of the chain and an eyelet coupled to the other end of the chain. This eyelet is so shaped that it can be introduced into the ring. In order to prevent the eyelet from involuntarily or accidentally being removed from the slotted ring, an arch-like locking element is provided within the ring which, under pre-tension, bridges the slot or interruption in the ring by means of a spring element. For opening the locking device, the arch-like piece can be displaced into the hollow ring.

It is an object of the invention to provide a locking device of the aforementioned type which simplifies manufacture, is easy to use and is able to respond to stress exerted with relative large forces.

The inventive locking device is characterized by the provision of two plates which are pivotably coupled together for movement about a common pivot axis. Both plates are provided with an aperture through each of which the pivot axis and one of the end chain links extends. The first plate has a hook-shaped portion or part for receiving the other end chain link and the second plate has a slot formed therein which is concentrically positioned with respect to the pivot axis and which defines an arched piece which extends from the end of the second plate which is disposed distal to the pivot axis. This arched piece also runs substantially concentric with respect to the pivot axis and, in the locked position of the locking device, penetrates the end chain link received on the hook-shaped part of the first plate.

The subject matter of the invention will be explained in the following with reference to the drawings which illustrate some examples.

Figure 1:
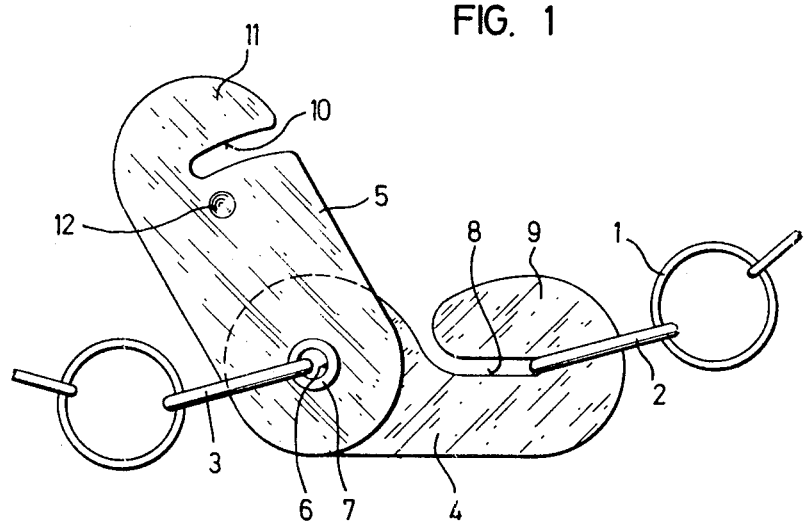
FIG. 1 is a side elevational view of a first embodiment of the locking device in accordance with the invention, shown in an open position.
Figure 2:
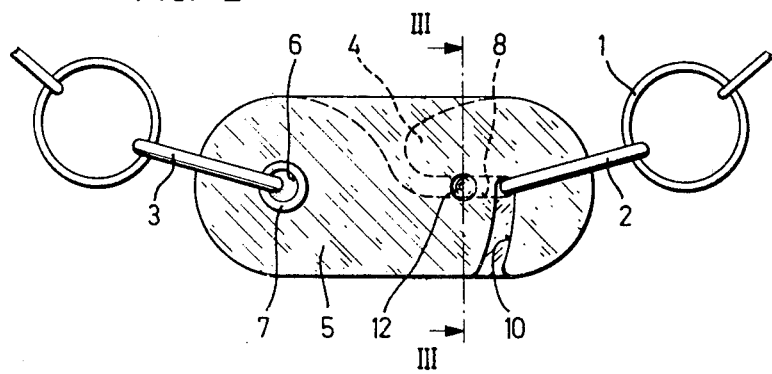
FIG. 2 is a view similar to that of FIG. 1, but showing the locking device in a locked position.
Figure 3:
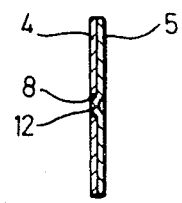
FIG. 3 is a sectional view taken along line III—III of FIG. 2.

Referring now in detail to the drawings, FIGS. 1 to 3 illustrate a first embodiment of the inventive locking device, showing the device in the open position, a locked position, and in a sectional view, respectively. The locking device acts as a releasable coupling of the two ends of a bracelet or necklace 1 of which only the end portions are shown in FIGS. 1 and 2. The bracelet or necklace may be any given piece of jewelry with the only prerequisite being that at each end of the same a chain link 2, 3 is present.

Essentially, the locking device comprises a first plate 4 and a second plate 5 having an aperture 6 through which a hollow-type rivet 7 extends, so that the plates are pivotable relative to each other around a pivot axis, perpendicular thereto. The end of the first plate 4 which faces away from hollow-type rivet 7 has a hook-like shape. A chain link 2 may be inserted or released through a guide slot 8. At least a portion of the guide slot 8 runs radially with respect to the mentioned pivot axis. End portion or part 9 which forms the hook of the first plate 4 is at no place wider than the largest inner diameter of chain link 2, so that the insertion and release of the same can be accomplished without causing any difficulties. At the end opposite to the hollow-type rivet 7, second plate 5 is provided with a slot 10 running concentrically with respect to the mentioned pivot axis. The outer end of second plate 5 is provided with an arched piece or portion 11.

When locking the locking device the arched piece 11 is placed into the chain link 2 which is inserted into the hook-like part 9 of first plate 4, as can be seen in FIG. 2. Preferably, chain links 2 and 3 are oblong chain links, the inside breadth or diameter of which is larger than the sum of the widths of the two plates 4 and 5. Guide slot 8 in first plate 4 and slot 10 in second plate 5 are so arranged that the closed end sections in the locked position of the plates overlap (see FIG. 2), whereby the free opening cross section is penetrated by a portion of chain link 2.

When the guide slot 8 and the slot 10 are correctly positioned the pulling force exerted on the locking device is evenly distributed to both plates. This results in a relatively high stress on the locking device. Preferably, second plate 5 is provided with a projection 12 directed against first plate 4, which is so arranged that this projection extends into the radial running portion of guide slot 8 and into the first plate 4, in the locked position, as shown in FIG. 3.

Slot 10 may be deflected at a right angle at its closed end with respect to the position shown in FIG. 2, provided that the guide slot 8 is also somewhat longer. In this way, a positive locking is obtained which cannot release itself as long as the locking device is subjected to tension.

Figure 4:
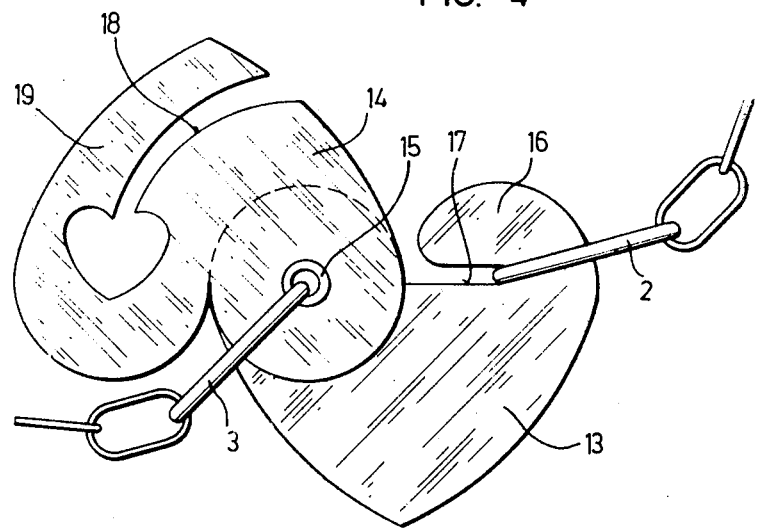
FIG. 4 is a side elevational view of a second embodiment of the inventive locking device, shown in an open position.
Figure 5:
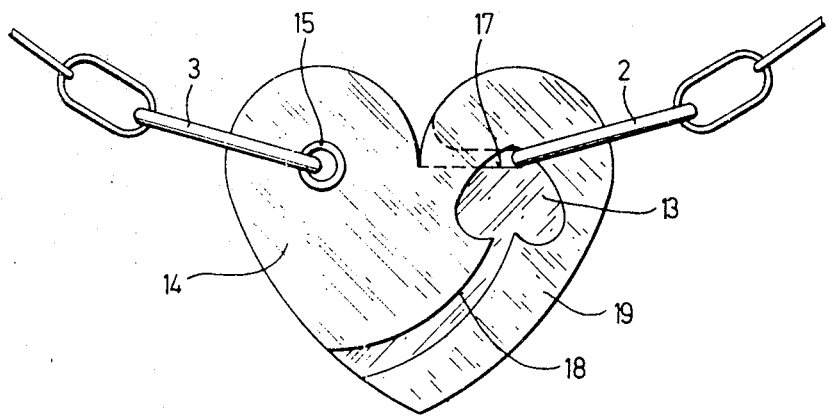
FIG. 5 is a view similar to that of FIG. 4, but showing the locking device in a locked position.

A further embodiment of the inventive locking device is shown in FIGS. 4 and 5. This example shows that the shape of the plates may be adjusted to fashionable requirements. This locking device comprises a first essentially heart-shaped plate 13 and a second essentially heart-shaped plate 14. The two plates 13 and 14 are pivotably coupled with each other by means of a hollow-type rivet 15. The one end chain link 3 extends through the hollow-type rivet 15 and the other end chain link 2 is inserted into a hook-like part 16 of the first plate 13. The hook-like part 16 is obtained by providing a guide slot 17 which runs radially with respect to hollow-type rivet 15 in first plate 13. Second plate 14 is provided with a slot 18 which runs concentrically with respect to hollow-type rivet 15. An arched piece 19 of second plate 14 extends substantially parallel to the slot. The closed end of slot 18 is heart shaped for further ornamentation.

Instead of hollow-type rivet 7 or 15 in second plate 5 or 14, an aperture may be punched which engages a protruding edge of the adjacent side of plate 4 or 13, whereby the edge penetrates the aperture 6 in the first plate 4 or 13 and is provided with an outer flange on the rear side of the first plate, for example.

The above described locking device is particularly suitable for jewelry, e.g., bracelets and necklaces. The device may be made of metal, for example, silver, gold, or alloys thereof.

The above described locking device can also be used for locking belts or at any place where band-like elements are present which have to be coupled by means with eyelets. The locking device may also be made of plastic materials.

What is claimed is:

1. A jewelry clasp for bracelets and necklaces having two ends, each provided with a chain link, comprising:
a first plate and a second plate, which are pivotably coupled together for movement about a common pivot axis between an opening and locking position, said plates each having an aperture formed therethrough aligned with said pivot axis through which one of the chain links may extend, said first plate having a hook-like end portion which defines a guide slot for receiving the other of the chain links and said second plate having an arcuate slot formed therein having a portion running in a concentric manner with respect to the pivot axis which defines an arched portion on an end portion of said second plate disposed distal to the pivot axis relative to another end portion thereof which arched portion also runs generally concentrically with respect to the pivot axis and which, in said locking position, is received through said other chain link received in said guide slot of said hook-like end portion of said first plate, said guide slot of said first plate having a first portion opening onto an edge of said first plate which runs in a generally non-radial direction relative to said pivot axis and a second portion which merges with said first portion and which runs substantially in a radial direction relative to said pivot axis and which, in said locking position, crosses said arcuate slot of said second plate to define a single open area of overlap through which said other chain link may extend, said area of overlap lying exclusively in the radially running and the concentrically running portions of said guide slot and arcuate slot, respectively said area of overlap having a cross-section closely equal to the cross section of said other chain link, and said area of overlap being located at the terminal closed end of each slot.

2. The clasp according to claim 1, wherein said plates are substantially congruently-shaped.

3. The clasp according to claim 1, wherein in order to obtain a ratchet effect, said second plate is provided with a projection on a side thereof adjacent to said first plate which, in the locking position, snaps into the radial running portion of said guide slot.

4. The clasp according to claim 1, wherein said plates are pivotably coupled together by means of a hollow-type rivet.

5. The clasp according to claim 1, wherein said arcuate slot runs exclusively in a concentric manner with respect to said pivot axis.

* * * * *